(12) United States Patent
Ge et al.

(10) Patent No.: US 10,995,792 B1
(45) Date of Patent: May 4, 2021

(54) SELF-RETAINING CONCENTRIC BUSHING ASSEMBLY

(71) Applicant: Steering Solutions IP Holding Corporation, Saginaw, MI (US)

(72) Inventors: Yongpeng Ge, Jiangsu (CN); Jason T. Rutkiewicz, Freeland, MI (US); Jeffer Li, Jiangsu (CN); Benjamin Sauter, Essexville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/694,777

(22) Filed: Nov. 25, 2019

(51) Int. Cl.
*F16C 17/02* (2006.01)
*F16C 33/08* (2006.01)

(52) U.S. Cl.
CPC .............. *F16C 17/02* (2013.01); *F16C 33/08* (2013.01)

(58) Field of Classification Search
CPC .. B62D 1/16; B62D 7/16; B62D 55/15; F16C 11/02; F16C 11/04; F16C 11/045; F16C 17/02; F16C 17/107; F16C 33/04; F16C 33/08; F16C 33/20; F16C 35/02; F16C 2326/24; F16C 2361/41; F16D 3/382; F16D 3/385
See application file for complete search history.

(56) References Cited

U.S. PATENT DOCUMENTS 3,044,281 A * 7/1962 Smith ...................... B62D 1/16
464/71
7,367,890 B2 * 5/2008 Zhou ...................... F16D 3/385
464/8

FOREIGN PATENT DOCUMENTS

FR            546936 A  * 11/1922   .............. F16C 35/10

* cited by examiner

*Primary Examiner* — Phillip A Johnson
(74) *Attorney, Agent, or Firm* — Dickinson Wright PLLC

(57) ABSTRACT

A concentric bushing assembly is provided. The assembly includes a bushing having a bushing cylindrical body extending to a first outer diameter and a bushing flanged end extending to a second outer diameter that is larger than the first outer diameter. The assembly also includes an insert having an insert cylindrical body extending to a third outer diameter and an insert flanged end extending to a fourth outer diameter that is larger than the third outer diameter, the cylindrical body disposed within the bushing cylindrical body.

16 Claims, 4 Drawing Sheets

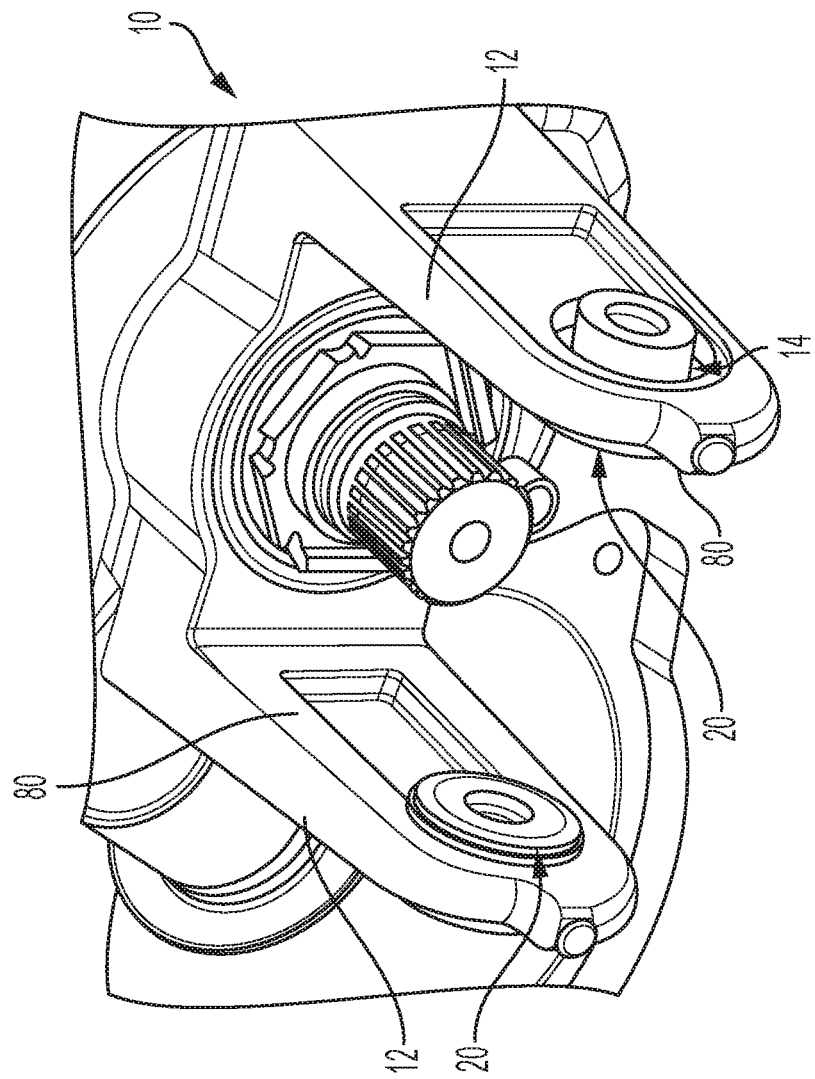

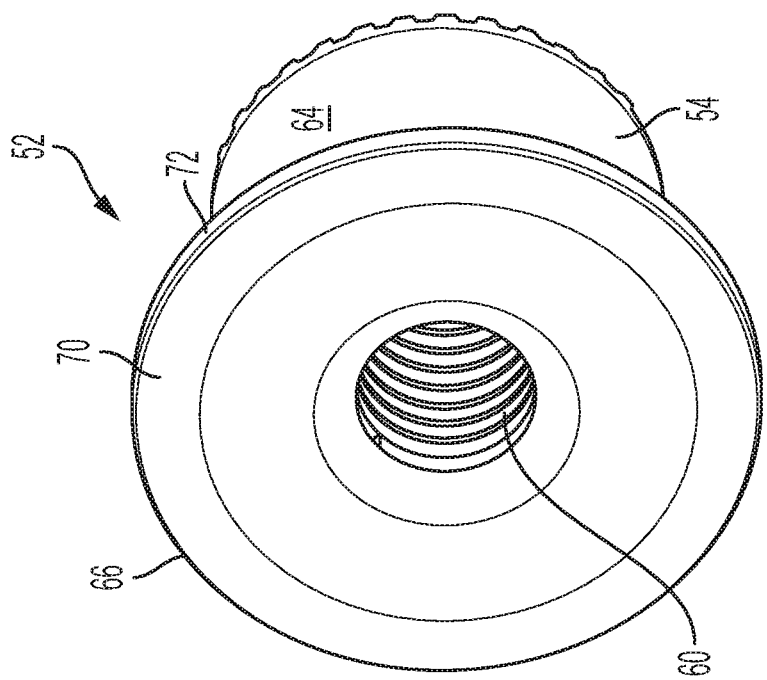
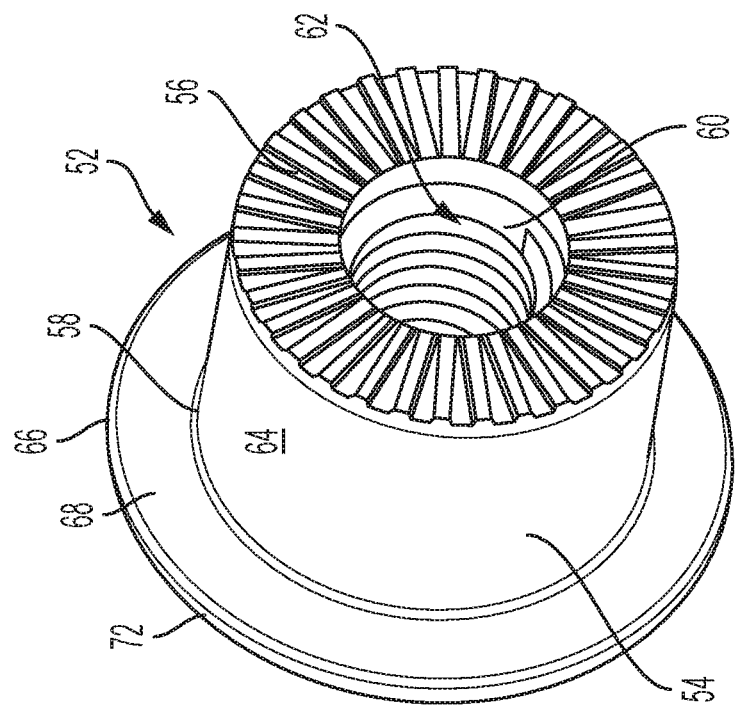

US 10,995,792 B1

SELF-RETAINING CONCENTRIC BUSHING ASSEMBLY

FIELD OF THE INVENTION

This disclosure generally relates to concentric bushing assemblies and, more particularly, to a self-retaining concentric bushing assembly for steering systems.

BACKGROUND

One type of electric power steering system includes power assistance provided at a column portion of the steering assembly and may be referred to as column electric power steering (CEPS). Various CEPS lower mounting geometries can be differentiated into high mount and concentric lower mounting positions. High mount is defined by mounting points that are off centered relative to the pivot point of the I-shaft yolk attached to the output shaft—typically above the output shaft centerline. Thus, reference is made to a high mount. Concentric mounting means that the lower mounting points are symmetrically placed on both sides of the output shaft concentric with the pivot point of the I-shaft attached to the output shaft.

Each of the two above-described mounting configurations have different type of bushing assemblies that may be utilized. The high mount geometry allows the use of one single lower mounting sleeve, while the concentric mount geometry requires two separate lower mounts on either side in order to allow clearance for the output shaft and the intermediate shaft yolk in the center. Both lower mounting geometries typically use rubber or plastic bushings, but each has cost and performance considerations.

SUMMARY

According to one aspect of the disclosure, a concentric bushing assembly is provided. The assembly includes a bushing having a bushing cylindrical body extending to a first outer diameter and a bushing flanged end extending to a second outer diameter that is larger than the first outer diameter. The assembly also includes an insert having an insert cylindrical body extending to a third outer diameter and an insert flanged end extending to a fourth outer diameter that is larger than the third outer diameter, the cylindrical body disposed within the bushing cylindrical body.

According to another aspect of the disclosure, a mounting assembly for a steering column assembly is provided. The mounting assembly includes a first ear defining a first aperture with a first aperture wall. The mounting assembly also includes a second ear defining a second aperture with a second aperture wall, the first ear and the second ear defining a space therebetween. The mounting assembly further includes a first bushing assembly disposed in the first aperture. The first bushing assembly includes a bushing having a bushing cylindrical body extending to a first outer diameter and a bushing flanged end extending to a second outer diameter that is larger than the first outer diameter. The first bushing assembly also includes an insert having an insert cylindrical body extending to a third outer diameter and an insert flanged end extending to a fourth outer diameter that is larger than the third outer diameter, the cylindrical body disposed within the bushing cylindrical body.

According to another aspect of the disclosure, a

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a mounting portion of a steering column assembly;

FIG. 4 is a first perspective view of an insert;

FIG. 5 is a second perspective view of the insert; and

DETAILED DESCRIPTION

Figure 3:
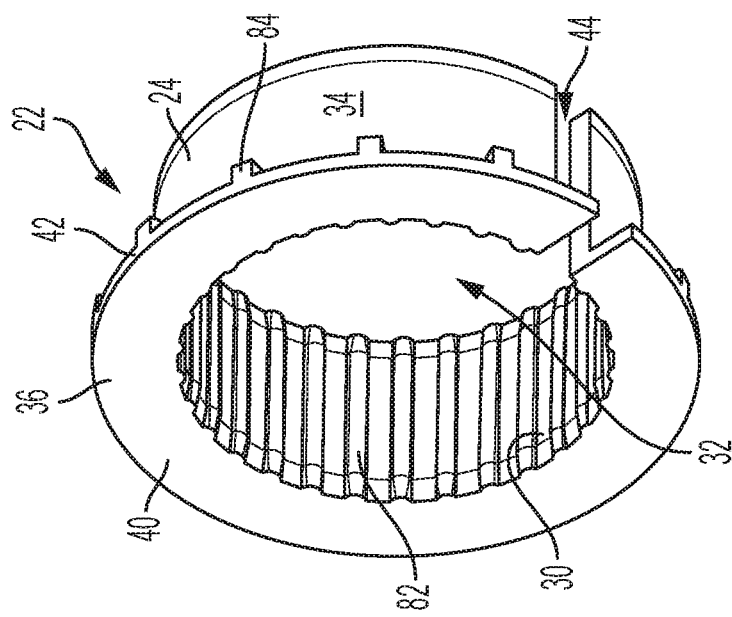
FIG. 3 is a second perspective view of the bushing.

Referring now to the Figures, where the present disclosure will be described with reference to specific embodiments, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 illustrates a portion of a steering column assembly. In particular, a mounting portion 10 of the steering column assembly is shown. The mounting portion 10 is mounted to another component (not shown) in manner that allows the coupled components to pivot relative to each other. In some embodiments, one of the coupled components is a column electric power steering (CEPS) assembly which provides an assist load to the steering effort of the system.

The mounting portion 10 includes a pair of ears 12 defining a space there between. Each of the ears 12 defines an aperture 14 to allow a shaft (not shown) to pass though each of the apertures to make the mounting portion 10 a pivotable mount for the components coupled to each other.

A bushing assembly 20 is provided in each of the apertures 14. The embodiments of the bushing assembly 20 stabilize movement of the shaft passing through the apertures 14 and assist with pivoting movement of the steering column, as will be appreciated from the disclosure.

Figure 2:
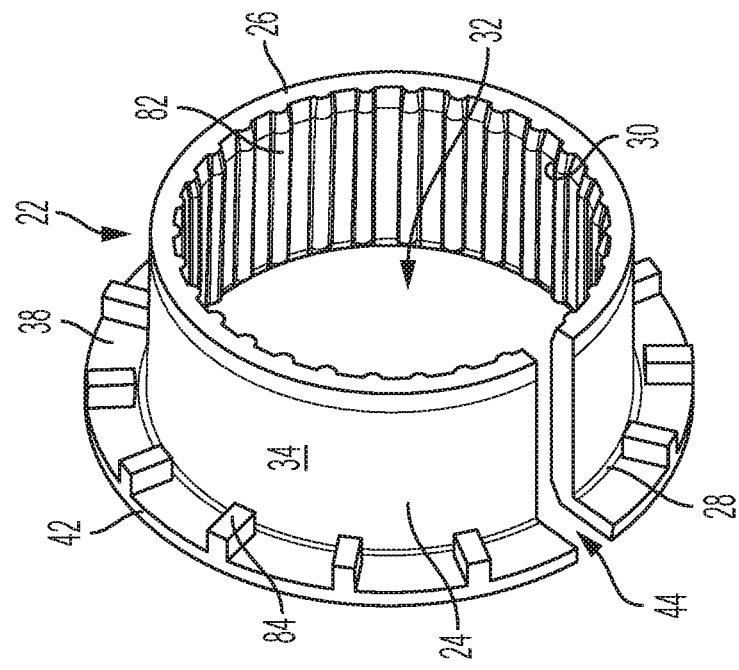
FIG. 2 is a first perspective view of a bushing.

Referring now to FIGS. 2 and 3, a bushing 22 of the bushing assembly 20 is shown in greater detail. The bushing 22 includes a cylindrical body 24 extending axially from a first end 26 to a second end 28. The cylindrical body 24 has an inner diameter 30 that defines a bushing opening 32. The cylindrical body 24 extends radially outward form the inner diameter 30 to an outer diameter 34. The bushing 22 also includes a flanged end 36 extending axially from a first side 38 to a second side 40. The first side 38 of the flanged end 36 corresponds to the second end 28 of the cylindrical body 24 of the bushing 22. As shown, the flanged end 36 extends radially outward to an outer diameter 42 that is larger than the outer diameter 34 of the cylindrical body 24.

In some embodiments, the bushing 22 includes a break 44 that extends axially through the entire bushing 22. The break 44 is a void that prevents the bushing 22 from being a continuous, 360 degree cylinder. The break 44 extends along the cylindrical body 24 and the flanged end 36. In other embodiments, the break 44 is not present and the bushing is a continuous, 360 degree cylinder.

Referring now to FIGS. 4 and 5, an insert 52 of the bushing assembly 20 is shown in greater detail. The insert 52 includes a cylindrical body 54 extending axially from a first end 56 to a second end 58. The cylindrical body 56 has an inner diameter 60 that defines an insert opening 62 that is threaded to allow the shaft to coupled thereto. The cylindrical body 54 extends radially outward form the inner diameter 60 to an outer diameter 64. The bushing 52 also includes a flanged end 66 extending axially from a first side 68 to a second side 70. The first side 68 of the flanged end 66 corresponds to the second end 58 of the cylindrical body 54 of the insert 52. As shown, the flanged end 66 extends radially outward to an outer diameter 72 that is larger than the outer diameter 64 of the cylindrical body 54.

The bushing 22 is formed of plastic and the insert 52 is formed of a metal, such as steel.

Figure 6:
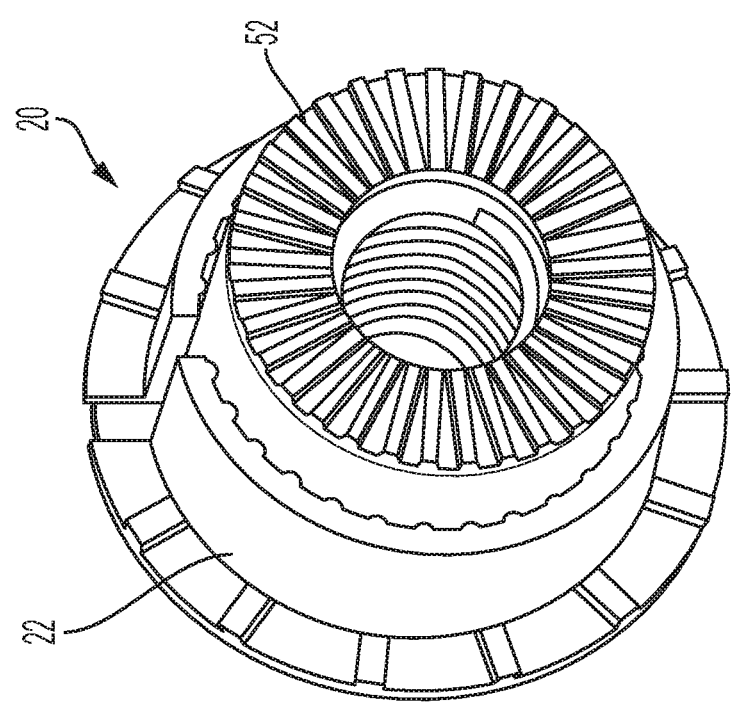
FIG. 6 is a perspective view of the bushing and insert in an assembled condition.

Referring now to FIGS. 1 and 6, the bushing assembly 20 is illustrated in an assembled condition. In particular, the insert 52 is shown disposed within the bushing opening 32 and the bushing 22 within the aperture 14 of the mounting ear 12. Although a single bushing assembly (i.e., first bushing assembly) is described in detail, it is to be understood that a second, identical bushing assembly is present and configured to be positioned within the aperture of the other mounting ear 12.

The bushing 22 is inserted from an inner side 80 of the mounting ear 12, with the first end 26 of the cylindrical body 24 of the bushing 22 being the leading end for insertion. The bushing 22 is inserted into the aperture 14 until the bushing 22 is fully seated within the aperture 14. Subsequently, the insert 52 is inserted from the inner side 80 of the mounting ear 12, with the first end 56 of the cylindrical body 54 of the insert 52 being the leading end for insertion. The insert 52 and the inner diameter 30 of the bushing 22 are dimensioned to facilitate a press fit relationship between the insert 52 and the bushing 22 as the insert 52 is pressed into the bushing 22.

During the press fit insertion of the insert 52 and the bushing 22, a plurality of circumferentially spaced radial crush ribs 82 positioned on the inner diameter 30 of the bushing 22 are compressed (FIGS. 2 and 3). The compressed radial crush ribs 82 are deformed during the press fitting. This deformation provides compliance for a safe press fit with acceptable rake effort and press loads. The deformation also provides a lash free and tight fit that is able to carry the assist load of the CEPS assembly and to accept road input and rattle without creating noise in the interface while at the same time providing acceptable press loads during assembly and relatively low rake efforts during pivoting of the steering column in the vehicle.

In the assembled condition of the bushing assembly 20, the first side 68 of the flanged end 66 of the insert 52 is in abutment with the second side 40 of the flanged end 36 of the bushing 22. Similarly, the first side 38 of the flanged end 36 of the bushing 22 is in abutment with the inner side 80 of the mounting ear 12. The first side 38 of the flanged end 36 of the bushing 22 includes a plurality of circumferentially spaced axial crush ribs 84 (FIGS. 2 and 3). The axial crush ribs 84 are configured to be deformed during assembly to allow the inserts to be pressed to a defined insert span that the vehicle bracket will meet up with during assembly in vehicle, while maintaining a tight axial fit.

The embodiments of the bushing assembly 20 disclosed herein are able to be installed against an "as cast drafted" (i.e., non-machined) mounting ear surface. Additionally, the bushing assembly 20 can be securely preassembled (e.g., pressed) into the mounting ear 12—without an additional cap on the outside of the mounting ears—prior to vehicle assembly and then become a "captive" bushing assembly after vehicle assembly due to the shoulder on the inside preventing the mounting ears to move/fall out of the bushing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A concentric bushing assembly comprising:
a bushing having a bushing cylindrical body extending to a first outer diameter and a bushing flanged end extending to a second outer diameter that is larger than the first outer diameter; and
an insert having an insert cylindrical body extending to a third outer diameter and an insert flanged end extending to a fourth outer diameter that is larger than the third outer diameter, the cylindrical body disposed within the bushing cylindrical body, wherein an inner diameter of the bushing cylindrical body includes a plurality of circumferentially spaced radial crush ribs.

2. A concentric bushing assembly comprising:
a bushing having a bushing cylindrical body extending to a first outer diameter and a bushing flanged end extending to a second outer diameter that is larger than the first outer diameter; and
an insert having an insert cylindrical body extending to a third outer diameter and an insert flanged end extending to a fourth outer diameter that is larger than the third outer diameter, the cylindrical body disposed within the bushing cylindrical body, wherein the bushing includes a break that defines a discontinuous bushing in the circumferential direction of the bushing.

3. A concentric bushing assembly comprising:
a bushing having a bushing cylindrical body extending to a first outer diameter and a bushing flanged end extending to a second outer diameter that is larger than the first outer diameter; and
an insert having an insert cylindrical body extending to a third outer diameter and an insert flanged end extending to a fourth outer diameter that is larger than the third outer diameter, the cylindrical body disposed within the bushing cylindrical body, wherein a side of the bushing flanged end includes a plurality of circumferentially spaced axial crush ribs.

4. The concentric bushing assembly of claim 3, wherein the bushing is plastic.

5. The concentric bushing assembly of claim 3, wherein the insert is steel.

6. A mounting assembly for a steering column assembly comprising:
- a first ear defining a first aperture with a first aperture wall;
- a second ear defining a second aperture with a second aperture wall, the first ear and the second ear defining a space therebetween;
- a first bushing assembly disposed in the first aperture, the first bushing assembly comprising:
  - a bushing having a bushing cylindrical body extending to a first outer diameter and a bushing flanged end extending to a second outer diameter that is larger than the first outer diameter; and
  - an insert having an insert cylindrical body extending to a third outer diameter and an insert flanged end extending to a fourth outer diameter that is larger than the third outer diameter, the cylindrical body disposed within the bushing cylindrical body, wherein a side of the bushing flanged end includes a plurality of circumferentially spaced axial crush ribs.

7. The mounting assembly of claim 6, wherein the bushing is plastic.

8. The concentric bushing assembly of claim 6, wherein the insert is steel.

9. The concentric bushing assembly of claim 6, wherein the outer diameter of the bushing cylindrical body is in contact with the first aperture wall of the first ear.

10. The concentric bushing assembly of claim 6, further comprising a second bushing assembly disposed in the second aperture, the second bushing assembly comprising:
- a bushing having a bushing cylindrical body extending to a first outer diameter and a bushing flanged end extending to a second outer diameter that is larger than the first outer diameter; and
- an insert having an insert cylindrical body extending to a third outer diameter and an insert flanged end extending to a fourth outer diameter that is larger than the third outer diameter, the cylindrical body disposed within the bushing cylindrical body.

11. A mounting assembly for a steering column assembly comprising:
- a first ear defining a first aperture with a first aperture wall;
- a second ear defining a second aperture with a second aperture wall, the first ear and the second ear defining a space therebetween;
- a first bushing assembly disposed in the first aperture, the first bushing assembly comprising:
  - a bushing having a bushing cylindrical body extending to a first outer diameter and a bushing flanged end extending to a second outer diameter that is larger than the first outer diameter; and
  - an insert having an insert cylindrical body extending to a third outer diameter and an insert flanged end extending to a fourth outer diameter that is larger than the third outer diameter, the cylindrical body disposed within the bushing cylindrical body, wherein an inner diameter of the bushing cylindrical body includes a plurality of circumferentially spaced radial crush ribs.

12. The concentric bushing assembly of claim 11, further comprising a second bushing assembly disposed in the second aperture, the second bushing assembly comprising:
- a bushing having a bushing cylindrical body extending to a first outer diameter and a bushing flanged end extending to a second outer diameter that is larger than the first outer diameter; and
- an insert having an insert cylindrical body extending to a third outer diameter and an insert flanged end extending to a fourth outer diameter that is larger than the third outer diameter, the cylindrical body disposed within the bushing cylindrical body.

13. A mounting assembly for a steering column assembly comprising:
- a first ear defining a first aperture with a first aperture wall;
- a second ear defining a second aperture with a second aperture wall, the first ear and the second ear defining a space therebetween;
- a first bushing assembly disposed in the first aperture, the first bushing assembly comprising:
  - a bushing having a bushing cylindrical body extending to a first outer diameter and a bushing flanged end extending to a second outer diameter that is larger than the first outer diameter; and
  - an insert having an insert cylindrical body extending to a third outer diameter and an insert flanged end extending to a fourth outer diameter that is larger than the third outer diameter, the cylindrical body disposed within the bushing cylindrical body, wherein the bushing includes a break that defines a discontinuous bushing in the circumferential direction of the bushing.

14. The concentric bushing assembly of claim 13, further comprising a second bushing assembly disposed in the second aperture, the second bushing assembly comprising:
- a bushing having a bushing cylindrical body extending to a first outer diameter and a bushing flanged end extending to a second outer diameter that is larger than the first outer diameter; and
- an insert having an insert cylindrical body extending to a third outer diameter and an insert flanged end extending to a fourth outer diameter that is larger than the third outer diameter, the cylindrical body disposed within the bushing cylindrical body.

15. A mounting assembly for a steering column assembly comprising:
- a first ear defining a first aperture with a first aperture wall;
- a second ear defining a second aperture with a second aperture wall, the first ear and the second ear defining a space therebetween;
- a first bushing assembly disposed in the first aperture, the first bushing assembly comprising:
  - a bushing having a bushing cylindrical body extending to a first outer diameter and a bushing flanged end extending to a second outer diameter that is larger than the first outer diameter; and
  - an insert having an insert cylindrical body extending to a third outer diameter and an insert flanged end extending to a fourth outer diameter that is larger than the third outer diameter, the cylindrical body disposed within the bushing cylindrical body, wherein the bushing flanged end is in contact with an inner side of the first ear.

16. The concentric bushing assembly of claim 15, further comprising a second bushing assembly disposed in the second aperture, the second bushing assembly comprising:
- a bushing having a bushing cylindrical body extending to a first outer diameter and a bushing flanged end extending to a second outer diameter that is larger than the first outer diameter; and
- an insert having an insert cylindrical body extending to a third outer diameter and an insert flanged end extending to a fourth outer diameter that is larger than the third outer diameter, the cylindrical body disposed within the bushing cylindrical body.

\* \* \* \* \*